Jan. 31, 1956

W. A. BLASER ET AL 2,732,678

PICK-UP FOR SEED CROPS

Filed Feb. 20, 1953

Jan. 31, 1956  W. A. BLASER ET AL  2,732,678
PICK-UP FOR SEED CROPS
Filed Feb. 20, 1953  2 Sheets-Sheet 2

Wilfred A. Blaser
Roy H. McLain
INVENTORS

BY

Merrill M. Blackburn
Atty

United States Patent Office 2,732,678
Patented Jan. 31, 1956

2,732,678

PICK-UP FOR SEED CROPS

Wilfred A. Blaser and Roy W. McLain, Davenport, Iowa, assignors to Innes Company, Bettendorf, Iowa, a corporation of Delaware Application February 20, 1953, Serial No. 338,042

12 Claims. (Cl. 56—364)

The present invention relates to pick-ups for use with traveling harvesters. Among the objects of this invention are:

The provision of a pick-up which will be free from injury by stones lying on the surface of the ground;

The provision of a pick-up having a moving conveyor means to strip the product being picked up from the fingers doing the picking up;

The provision of a flexible conveyor means to carry the picked up material;

The provision of a pick-up in which the raddle bars are recessed to a position where they do not at any time come into contact with rocks or other foreign obstacles lying on the ground, and become bent thereby;

The provision of a pick-up for harvesters and combines positioned in advance of and secured to the harvester frame in such a manner as to pick up unthreshed grain and other seed-bearing crops from windrows in the field and deliver the same to the operating mechanism of the harvester;

The provision of an improved mounting for a pick-up mechanism by which the latter may more easily adapt itself to irregularities in the ground surface and thus insure a more intimate and effective relation between the pick-up fingers and the ground;

The provision of a resilient or floating support for a pick-up mechanism by which the fingers thereof, when in raking position, may be maintained in light contact with the ground surface, in order to insure a more effective raking action;

The provision of improved finger-travel to more effectively lift and convey the vegetation to the point of discharge;

The provision of a pick-up mechanism by which there are more than one row of fingers raking simultaneously, staggered to provide complete coverage of the ground without being in such close proximity to each other in any one row, thus working together, as to pick up stones; and The provision of a pick-up mechanism in which the fingers are utilized to give the vegetation a positive, aggressive, and continuous start on its travel on the conveyor means.

After the fingers have served the valuable purpose of giving the vegetation an active start in its travel on the conveyor means, they are withdrawn from the surface of the conveyor means, which allows the vegetation to be conveyed and discharged without the common difficulty of becoming lodged in or around the fingers, as is very possible in the commonly known method of having the fingers fastened to the surface of the conveyor means and, therefore, travel around the roller at the point of discharge, creating a "back feeding" problem. Overcoming this situation has required extra rollers, strippers, or beaters, of various descriptions to prevent the vegetation from following the fingers around the lower, or return, side of the conveying means.

In addition to the objects, advantages, and capabilities inherent in the structure as disclosed in the present description, our invention resides, also, in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Fig. 5 represents a spring and a pair of spring fingers without the clip.

Reference will now be made in greater detail to the annexed drawings for a more complete description of this invention. Two caster wheels 1 and 2 are offset from the body of the pick-up, as shown at 3. As these caster wheels are of usual construction, it seems not necessary to describe them in detail. There is common attaching means 4 whereby the pick-up is attached to a harvester, or a combine, or other means with which it is used.

Figure 4:
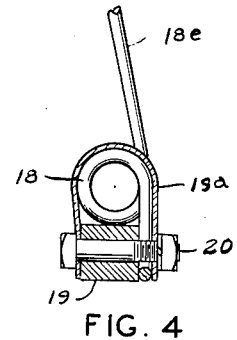
Fig. 4 represents an enlarged partial transverse section substantially along the plane indicated by the line 4—4, in Fig. 3.

The spring fingers 18a and 18e are mounted on alternate raddle bars 19 to pick up vegetation, for example, wheat, barley, and oats, as they travel forwardly and upwardly. The raddle bars 19 are received in the channels or spaces 16 in the rollers 14 and 15, and are thereby protected from stones lying in the fields. The spring fingers 18a and 18e, connected together in pairs by the springs 18, are received in alternate slots 18b and 18d and are integral with the springs 18 which are enclosed within clips 19a, held in place by bolts 20. There is one clip 19a to each spring 18, as shown most clearly in Fig. 4. However, the clips 19a may be omitted by the spring fingers being held by bolts 20 to the raddle bars 19.

From the above it will be seen that the spring fingers 18a and 18e do not all strike the ground at the same time, fingers 18a striking the ground at the same time, and then the next row of fingers 18e striking the ground, because the raddle bars 19, carrying the spring fingers 18a and 18e alternate in their motion, being in different channels 16.

Figure 2:
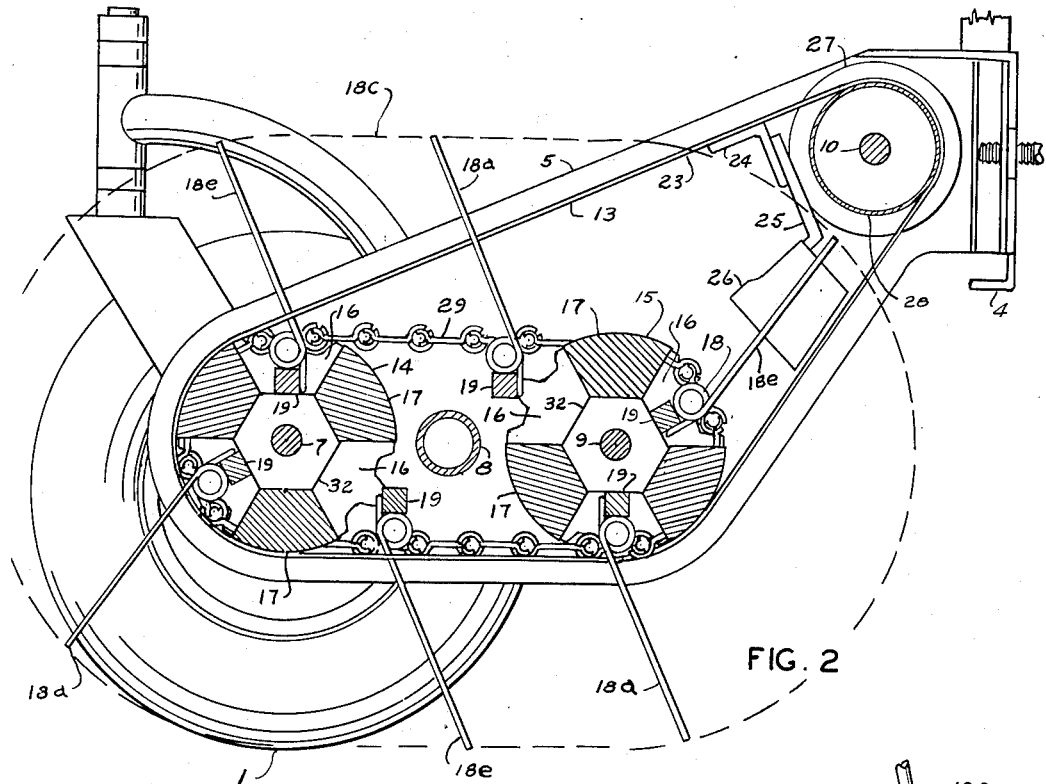
Fig. 2 represents an enlarged cross-section of the structure shown in Fig. 1, taken substantially along the plane indicated by the line 2—2 in that figure.

To act as stripping means for the spring fingers 18a and 18e, in removing vegetation therefrom, the belts 13 run around the rollers 14, 15, and 28. The fingers 18a and 18e extend out through, respectively, the slots 18b and 18d and, as shown in Fig. 2, withdraw, as indicated by the broken line 18c, showing the course of the tips of the fingers in crossing the belts 13 at 23.

Figure 3:
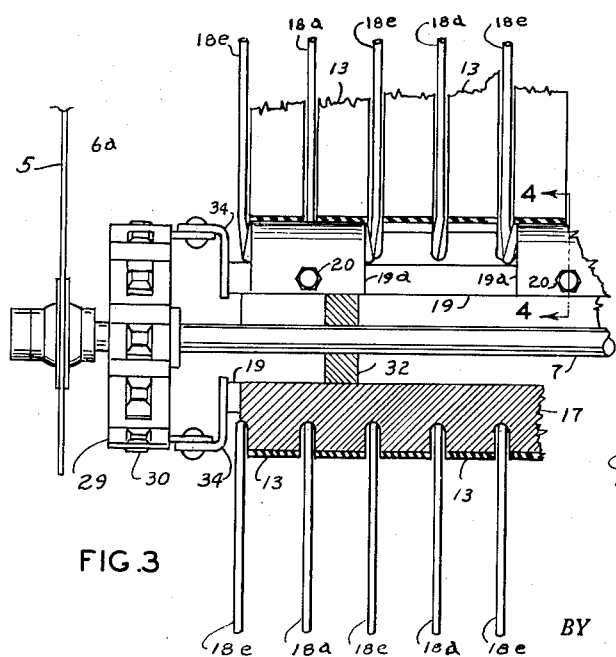
Fig. 3 represents a fragmentary longitudinal section and elevation taken substantially along the plane indicated by the line 3—3, in Fig. 1.

There are end plates or frames 5, one of which is shown as covered by a shield 6, the shield being omitted, in the drawings, from the other one, as shown at 6a. Passing through the plates 5 are a plurality of shafts 7, 9, and 10, which are continuous through the pick-up and serve as carrying and driving means for the parts of the pick-up. The shaft 7 extends through the roller 14, and the shaft 9 extends through the roller 15. The spiders or roller supports 32 receive and are supported by the shafts 7 and 9, as clearly shown in Figs. 2 and 3. In normal operation, the machine is driven by a sprocket wheel 35, driving the shaft 10 and roller 28, and the front roller 14 is driven accordingly, except that belts 13 may slip under a heavy load but, when this takes place, the auxiliary drive through the chains 33 takes up the drive until the belts 13 resume the driving of the front roller 14. The belts 13 serve as gentle driving means for the roller 14, and sprocket chains 29, by means of the roller 14, drive the roller 15, the rollers 14 and 15 being synchronized in their operation thereby. Tube 8 is a structural part of the frame of the machine.

The rollers 14 and 15 are made up, in part, of fillers 17, mounted on roller supports 32 to provide channels or open spaces 16 between them for the reception of the raddle bars 19 on which are fastened springs 18, continuous with spring fingers 18a and 18e, the raddle bars 19 being received in consecutive spaces, those carrying spring fingers 18a and 18e being received in alternate spaces. The fillers 17, roller supports 32, springs 18, raddle bars 19, spring fingers 18a and 18e, sprocket chains 29, and sprockets 30 constitute a raddle. The raddle bars 19 are connected by offset brackets 34 to the sprocket chains 29, which are reeved over sprockets 30 and 31, as shown in Fig. 1, and are driven in unison.

A cross-bar 24 supports brackets 25, and these support V-shaped guides 26, insuring that the spring fingers 18a and 18e are guided into the proper slots 18b and 18d, respectively, between the belts 13 as they travel around the rollers 14, 15, and 28. Flanges 27 keep the belts 13 in their proper alignment on roller 28. Preferably, the flanges 27 are spaced slightly farther apart than the width of the belts 13. The roller 28 may consist of a drum having the spaced flanges 27 mounted thereon and preferably tack-welded thereto, or it may consist of a plurality of pulleys arranged side by side on the shaft 10, or it may be otherwise constructed.

Figure 1:
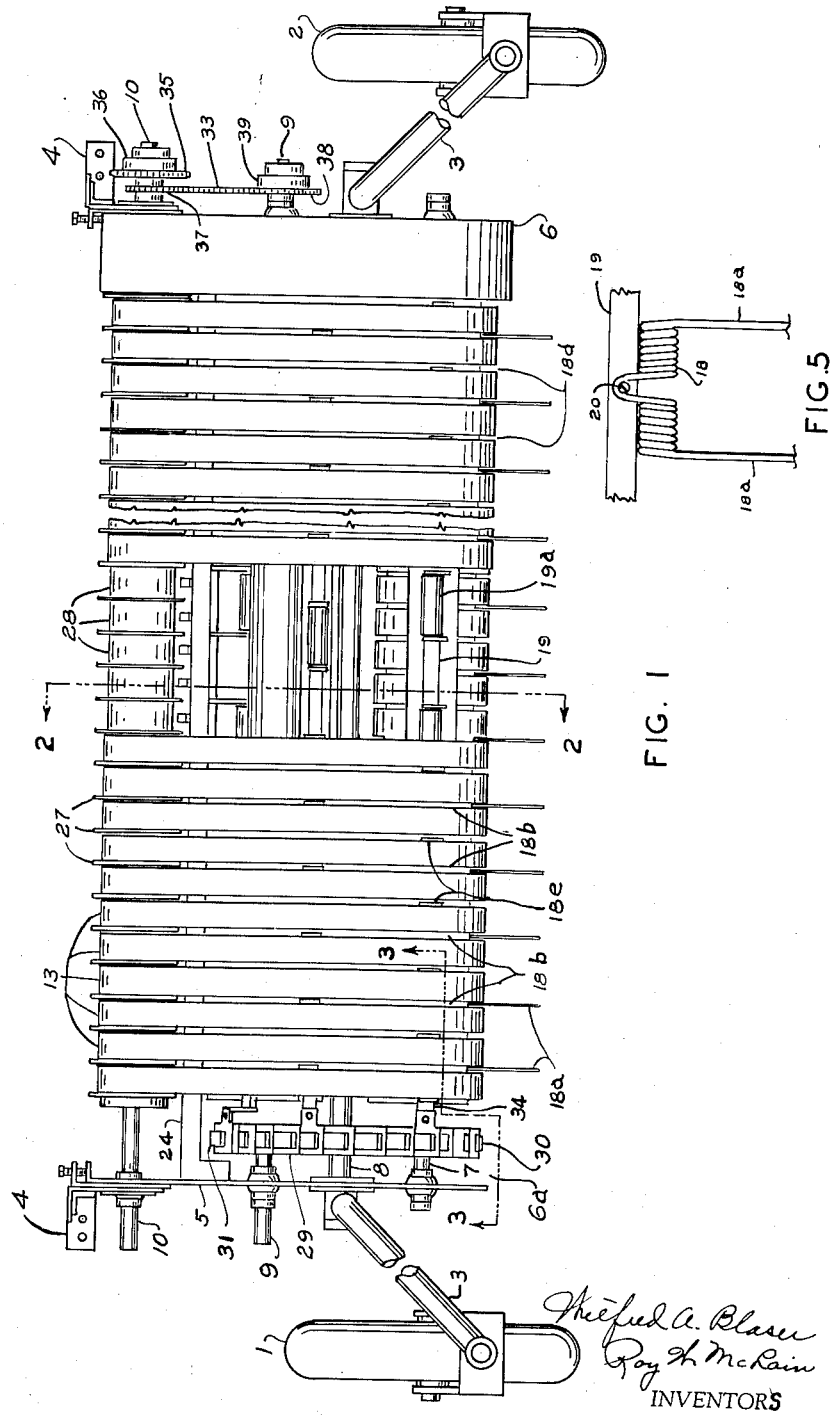
Fig. 1 shows a fragmentary plan view of a pick-up according to our invention with parts omitted.

In the middle of Fig. 1, several of the belts 13 are omitted in order to show inner construction. At the upper rear of Fig. 1, at the right, is shown shaft 10 which is a continuation of shaft 10 shown at the left of the figure. On this shaft 10 is a sprocket wheel 37, while on shaft 9 is a sprocket wheel 38, and these two sprocket wheels are connected by a sprocket chain 33. Sprocket wheel 38 is connected to shaft 9 only through ratchet clutch 39, thus allowing the complete raddle, which is synchronized by sprockets 30 and 31 and chains 29 with rollers 14 and 15, to be driven by the friction of the belts 13 slightly faster than it would be driven by chain 33 alone. When a load occurs causing the belts to slip, the chain drive 33 takes over through sprocket 38 and ratchet clutch 39. The object of this arrangement is to keep the belts taut on the top of the pick-up at all times and still not depend on the belts entirely for power for the raddle. The object of keeping the belts taut on the top side is to maintain the best stripping relation of the belts to the fingers.

The sprocket wheel 35 is connected in driving relation to the power unit of the pick-up.

A ratchet clutch 36 has a function in preventing the pick-up mechanism from turning backward when the drive source happens to be reversed, as for cleaning out the combine mechanism. A similar ratchet clutch 39 prevents the belts 13 from overdriving the sprocket chain 33.

By the term "fingers" we mean "projections," and these may be any type of elongated members extending from the basic pick-up mechanism.

Operation

This pick-up is for use as a part of a somewhat complex machine in gathering vegetation which has been cut off, such as wheat, barley, or oats. The vegetation lies on the ground, and the pick-up, in going over the field, picks up this vegetation, and the spring fingers 18a and 18e raise it high enough up to be carried over the pick-up by the spring fingers, and it is stripped from the fingers by the belts 13 and delivered over the rear of the pick-up to whatever conveyance is pushing the pick-up.

It is of course understood that the specific description of structure set forth above may be departed from without departing from the spirit of this invention as disclosed in this specification and as defined by the appended claims.

Having now described our invention, we claim:

1. A pick-up comprising a plurality of shafts, said shafts having rollers and sprockets thereon, said sprockets having chains reeved around them, said rollers having channels extending lengthwise thereof, bars received in said channels and secured to corresponding links of the chains, fingers secured to the bars, belt driving means above and to the rear of the rollers, the shafts of said rollers being approximately the same distance from the ground, and a plurality of belts reeved around the rollers and the belt driving means, whereby there are formed loops between the belts and the rollers, the loops formed by the belts crossing the path of the ends of the fingers as they travel around the rollers.

2. In a harvesting machine, a pair of rollers including shafts and having channels longitudinally of the rollers, sprocket wheels connected to the rollers, chains reeved around the sprocket wheels, said chains being approximately parallel to the ground, bars secured inside of the chains, a plurality of pulleys constituting a roller located above and to the rear of the first named rollers, belts surrounding the first mentioned rollers and the second mentioned roller, the belts enclosing the rollers forming a loop larger than the loops formed by the chains, fingers carried by the bars and extending outwardly in the spaces between the belts, and guides within the belts and within the paths of movement of said fingers as they move from within the belts to crop-engaging position outside of said belts, said guides serving thereby to guide the fingers into the spaces.

3. In a pick-up, pick-up rollers comprising support members, shafts on which said support members are mounted, chains at the ends of the rollers, sprockets on said shafts, said rollers comprising spaced fillers, bars riding in the spaces between said fillers, said bars being secured to said chains, said bars having coil springs secured thereto, said fillers being dimensioned so that not only said bars but also said spring coils lie in said spaces and below the surface of revolution on which the outer portions of said fillers lie, and spring fingers at the ends of the coil springs projecting outwardly to rake up vegetation from the ground as the pick-up travels over the ground.

4. A pick-up comprising, in part, a pair of rollers having longitudinal slots in the surface thereof, shafts for said rollers, timing mechanism on said shafts, said rollers being spaced horizontally and arranged in a substantially horizontal plane, bars secured to said timing mechanism and extending longitudinally of the rollers, fingers arranged outside of the bars, the fingers projecting normally outwardly from the bars at a substantially constant angle, and means arranged above the bars for removing picked up vegetation from the fingers as they go around the rollers.

5. A pick-up machine comprising a plurality of fingers carried by a plurality of bars, a pair of rollers having longitudinally extending channels, sprockets affixed, respectively, to the outer ends of the rollers, a pair of chains at opposite ends of the rollers, trained over said sprockets, said bars extending across the machine and connecting links of the chain, the bars being received in the longitudinally extending channels and carrying the fingers, a belt roller rearwardly of and above the first mentioned rollers, the depth of said channels being on the order of the corresponding dimension of said bars, and belts reeved around the first mentioned rollers and reeved also around the belt-rollers to act as vegetation removers for the fingers.

6. That part of a pick-up which comprises a pair of rollers having lengthwise channels in the surface thereof, sprockets located at the ends of the rollers in spaced relation with respect thereto, a pair of chains trained over the sprockets and located outwardly of the ends of the rollers, and bars connecting the chains and receivable in the channels of the rollers.

7. A pick-up comprising a plurality of shafts, and supports in which the shafts are mounted, two of the shafts having rollers mounted thereon and sprockets mounted on the ends of the shafts, a third shaft having belt pulleys mounted thereon above and to the rear of the rollers, the rollers having channels extending lengthwise thereof, bars positioned lengthwise on the rollers in the channels and extending axially outwardly of the rollers, chains reeved around the sprockets and connected to the ends of said bars, outwardly of said rollers, fingers mounted on said bars so that as the chains travel around the shafts the bars are received in the channels and are protected from the obstructions on the surface of the ground, and stripper belt means positioned over said rollers and lying between said fingers.

8. A pick-up as defined by claim 7 in which stationary means is located within said stripper belt means and outside of said bars for guiding said fingers to cause them to pass between said belt means.

9. A pick-up comprising a pair of rotatable members, means movably supported by said members and including a plurality of pick-up fingers and endless roller-supported means carrying said fingers, a third roller, the axes of all of said rollers being approximately parallel, said third roller being mounted at a distance from the plane containing the axes of said pair of rollers, stripper belt means carried by all of said rollers and including elements positioned on opposite sides of said fingers, said third roller being located so that during one portion of the path of movement of said fingers, the latter move to a position within said stripper belt means, and finger guiding means also positioned within said belt means and located adjacent the points at which said fingers emerge from within said belt means.

10. A pick-up comprising, in part, a finger bar, a spring finger member attachable to said bar and comprising a central coil section having a pair of finger elements projecting from the ends of the coil section and a central attaching section, the latter being approximately in the same plane as said finger elements, and a U-shaped clip encircling said coil section and having ends attached to said bar at opposite sides thereof.

11. A pick-up comprising, in part, a finger bar, a finger member attachable to said bar and comprising a coil section having finger elements projecting from opposite ends thereof and an attaching element projecting from a portion thereof intermediate the finger elements and adjacent to the bar, means securing said attaching element to the bar, and U-shaped clip embracing the coil section and secured to the bar.

12. In a pick-up, a plurality of rollers, a plurality of belts surrounding said rollers in driving relation, said rollers having longitudinal channels in the surface thereof, said rollers having central shafts, raddles having flexible driving means mounted on said rollers for rotation therewith, the normal operation of said pick-up driving the rollers by the belts slightly faster than when they are driven by said flexible driving means, and the flexible driving means taking over the drive when the load causes the belts to slip.

References Cited in the file of this patent
UNITED STATES PATENTS

| | | |
|---|---|---|
| 675,703 | Allen | June 4, 1901 |
| 2,458,713 | Linderer | Jan. 11, 1949 |
| 2,539,834 | Hatton | Jan. 30, 1951 |
| 2,546,318 | Rayburn | Mar. 27, 1951 |